United States Patent Office 3,580,740
Patented May 25, 1971

3,580,740
ZINC ELECTRODE CONTAINING LEAD SULFIDE TO REDUCE GASSING AT THE ZINC ELECTRODE IN HEAT STERILIZED SILVER ZINC ALKALINE BATTERY
Herbert I. James, Levittown, Pa., assignor to ESB Incorporated
No Drawing. Filed Sept. 4, 1968, Ser. No. 758,653
Int. Cl. H01m 41/00
U.S. Cl. 136—30
6 Claims

ABSTRACT OF THE DISCLOSURE

A zinc electrode containing a lead sulfide additive to reduce gassing at the zinc electrode which is used as the negative electrode in a heat sterilized silver-zinc alkaline battery. The lead sulfide effectively reduces gassing at the zinc electrode without adversely affecting the capacity of the heat sterilized battery, whereas the conventional mercuric oxide additive reduces the capacity of the heat sterilized battery. The lead sulfide additive may be used in amounts ranging from about 1 to about 10% by weight of the active material additive mixture.

BACKGROUND OF THE INVENTION

Zinc is a widely used anode material despite its tendency to self-discharge on standing, particularly in alkaline electrolyte. Even though zinc has a high hydrogen overvoltage which should make it difficult for the hydrogen ions to accept electrons from the zinc electrode, a substantial quantity of hydrogen is evolved at the zinc electrode during wet storage or stand. In order to substantially reduce the hydrogen evolution, mercury which has a higher hydrogen overvoltage than zinc is generally incorporated into the zinc electrode to raise the hydrogen overvoltage. It is conventional to add mercuric oxide (HgO) to zinc active material, usually uncharged zinc oxide, to reduce gassing. It is particularly important in sealed batteries to reduce gas evolution to amounts low enough to prevent excessive pressure build-up.

In the space exploration program, the United States has jointly agreed with Russia not to contaminate the planets on which landings are attempted with living cells from Earth. As a result, the instruments to be landed on the planets including the capsule and the power source for said instruments must be sterilized prior to the attempted landing.

Silver-zinc batteries are often used as power sources for the instruments used during planet explorations, and therefore, it became necessary to develop a silver zinc battery capable of being heat sterilized. It has been found that heat sterilization of conventional silver-zinc batteries causes a severe reduction in the capacity. During the investigation to determine the cause of the reduction in capacity, it was discovered that mercuric oxide caused the loss in capacity, for the heat sterilization caused the mercuric oxide to become more soluble in the alkaline electrolyte and the mercury contaminated the silver electrode, reducing the amount of silver converted to silver oxide during the charging of the battery. As a result, it became necessary to find a substitute for the mercuric oxide additive which could reduce the gassing of the zinc electrode and withstand the heat sterilization without adversely affecting the battery performance.

SUMMARY OF THE INVENTION

It is the general purpose of this invention to provide a zinc electrode containing an additive to reduce gassing which is capable of being heat sterilized without adversely affecting the battery performance. It has been discovered that lead sulfide (PbS) can be substituted for the mercuric oxide (HgO) in zinc electrodes to provide a substantial reduction in the gassing of the zinc electrodes. In addition, it has been found that silver-zinc alkaline batteries having zinc anodes containing PbS can be heat sterilized without adversely affecting the battery capacity. It has been found that in a heat sterilized silver-zinc battery, the PbS is effective in reducing gassing at the zinc electrode and does not adversely affect battery capacity such as the conventional HgO which dissolves in the hot alkaline electrolyte and contaminates the silver electrode.

Another advantage achieved by substituting the lead sulfide additive for the conventional HgO additive is the elimination of the embrittlement of the silver grid in the zinc electrode caused by amalgamation of the silver with the mercury. PbS does not affect the grid in this manner, and therefore, batteries in which the zinc electrode contains PbS instead of HgO are more capable of withstanding high impact. An additional feature is that the zinc electrodes containing the PbS additive appear to resist the formation of zinc dendrites which provides better cycling capability.

DESCRIPTION OF THE PREFERRED EMBODIMENT

In accordance with this invention, PbS is added to zinc electrodes to reduce the gassing (i.e. hydrogen evolution) of the zinc electrode in alkaline electrolyte and to enable the zinc electrode to be used in a battery which is to be heat sterilized without adversely affecting battery capacity. It is well known in the battery art that zinc electrodes which are to be used in alkaline electrolyte must contain an additive, usually mercuric oxide, to increase the hydrogen overvoltage of the electrode and thereby reduce the evolution of hydrogen at the zinc electrode. Since heat sterilized batteries employing zinc electrodes containing mercuric oxide had reduced capacity caused by mercury contamination of the positive (silver) electrode, it became necessary to find a substitute for the mercuric oxide. It has been found that PbS effectively reduces the hydrogen evolution at the zinc electrode without adversely affecting the capacity of heat sterilized silver-zinc alkaline batteries.

It has been found that heat sterilization adversely affects the capacity of charged silver-zinc alkaline batteries, and therefore, these batteries are heat sterilized in the discharged state and subsequently electrochemically charged to silver oxide-zinc metal active materials. The discharged state of the zinc active material is zinc oxide, and the zinc electrodes of this invention are generally prepared by mixing the PbS additive with ZnO powder and then compressing the mixture onto a silver grid to form a pressed powder electrode. The PbS additive generally comprises from about 1 to about 10% by weight of the zinc active material-additive mixture with from about 2 to about 6% by weight being particularly preferred. The amount of the additive is not highly critical so long as there is a sufficient amount to suppress gassing, though excessive amounts of PbS may adversely affect battery performance such as by formation of short circuits or interference with the charging of the silver electrode.

It is believed that in order to sufficiently sterilize the silver-zinc alkaline batteries, they should be heated to at least about 100° C. Early government specifications required that the batteries be tested at temperatures of 125° C., 135° C. and 145° C. Batteries using zinc electrodes in accordance with this invention are capable of being sterilized at a temperature of about 145° C., and possibly higher temperatures, without adversely affecting battery performance.

Inspection of heat sterilized silver-zinc alkaline batteries employing PbS in the zinc electrode which had been charged and discharged for several cycles revealed several interesting effects. The zinc electrodes appeared to have fewer zinc dendrites than zinc electrodes having no PbS, better structure after prolonged cycling, less change of shape and reduced loss of active material from the grid. It is believed that the PbS improves the cycle life and rechargeability of zinc electrodes. Some of the sulfur from the PbS additive may be entrapped in the separator where it can sequester silver ions by forming silver sulfide, and this helps to prevent short circuiting caused by migrating silver ions.

Another feature of alkaline batteries having zinc electrodes in accordance with this invention is the possible improved uncharged stand life at ordinary temperatures. Zinc electrodes having PbS instead of HgO may be particularly useful in batteries for use in hot climates, because of the relative insolubility of the PbS in alkaline electrolyte. In addition, lead is much cheaper than mercury and the PbS additive reduces the cost of the zinc electrode.

The following examples demonstrate the advantages achieved by using the zinc electrodes containing PbS instead of the conventional HgO additive:

Example I

Several pressed powder zinc electrodes were prepared with various additives and studied for their effect on gassing characteristics in alkaline electrolyte. The electrodes were prepared by mixing the indicated percentage by weight of each additive with zinc oxide powder and the mixture was pressed onto a silver wire grid using a pressure of about 5,000 p.s.i. The electrodes were electrochemically charged to metallic zinc in alkaline electrolyte. Half sized strips of the electrodes, in the charged condition, were placed in inverted burets containing alkaline electrolyte (40% KOH solution with 7.5% ZnO) and the volume of gas produced in 30 days was measured. The following results were recorded:

| Additive: | Ml. gas/30 days |
|---|---|
| None | 103 |
| 7% HgO | 1.0 |
| 1% PbS | 15.2 |
| 2% PbS | 12.4 |
| 3% PbS | 11.0 |
| 6% PbS | 6.4 |

These results clearly indicate that the zinc electrode must contain an additive to reduce gassing, and whereas the PbS was not quite as effective as the HgO, it effectively reduces the gassing of the zinc electrode in the alkaline electrolyte.

Example II

Several silver-zinc alkaline batteries were heat sterilized and then tested to determine the effect of heat sterilization upon the capacity of the batteries. The single variable in these batteries was the zinc electrode which contained the additives which were tested in Example I for their effect on gassing. The zinc electrodes were prepared as in Example I and the positive electrodes were conventional silver oxide plates. The battery contained a 40% KOH electrolyte solution and the separator comprised 4 layers of an irradiation produced graft copolymer of polyethylene and acrylic acid crosslinked by divinyl benzene (RAI 116) wrapped around the silver positive electrodes.

The silver-zinc alkaline batteries were heat sterilized in the uncharged condition at 145° C. for 112 hours. Thereafter, the batteries were cycled in open cells through a 3 cycle regime in which they were charged at 35 milliamperes for 91.4 hours and discharged at 600 milliamperes until the positive voltage vs. an Hg/HgO reference electrode was —0.100 volts. The following results were recorded:

| | Capacity (amp hrs.) | | |
|---|---|---|---|
| | Cycle 1 | Cycle 2 | Cycle 3 |
| Zn electrode additive: | | | |
| None | 2.40 | 2.05 | 1.99 |
| 2% HgO | 1.36 | 1.51 | 1.38 |
| 4% HgO | 1.22 | 0.94 | 1.21 |
| 7% HgO | 1.28 | 1.01 | 0.30 |
| 2% PbS | 2.40 | 2.40 | 2.40 |

These results clearly demonstrate that the HgO present in the electrode adversely affected the capacity of the heat sterilized silver-zinc battery, whereas the PbS additive did not reduce the capacity of the heat sterilized battery.

Having completely described this invention, what is claimed is:

1. An uncharged zinc electrode comprising zinc active material and lead sulfide to reduce gassing at the zinc electrode, said lead sulfide being present in amounts ranging from about 1 to about 10% by weight of the zinc active material-additive mixture.

2. A zinc electrode in accordance with claim 1 in which the lead sulfide ranges from about 2 to about 6% by weight.

3. A silver-zinc alkaline battery which in the uncharged state comprises a silver positive electrode, a zinc negative electrode, an alkaline electrolyte and a separator between said positive and negative electrodes, said uncharged zinc negative electrode containing from about 1 to about 10% by weight of lead sulfide additive.

4. A battery in accordance with claim 3 in which said uncharged zinc negative electrode contains from about 2 to about 6% by weight of lead sulfide.

5. A heat sterilized silver-zinc battery which in the uncharged state comprises a silver positive electrode, a zinc negative electrode, an alkaline electrolyte and a separator between said positive and negative electrodes, said uncharged zinc electrode containing from about 1 to about 10% by weight of lead sulfide, and said battery having been subjected to a temperature of at least about 100° C. to sterilize the components prior to charging the electrodes.

6. A battery in accordance with claim 5 in which the uncharged zinc electrode contains from about 2 to about 6% by weight of lead sulfide.

References Cited

UNITED STATES PATENTS

| | | | |
|---|---|---|---|
| Re. 25,608 | 6/1964 | Cahan | 136—26 |
| 2,983,777 | 5/1961 | Yardney | 136—30X |
| 3,069,486 | 12/1962 | Solomon et al. | 136—125X |
| 3,017,448 | 1/1962 | Cahan | 136—26 |
| 3,080,440 | 3/1963 | Ruetschi et al. | 136—26X |
| 3,170,816 | 2/1965 | Voss et al. | 136—26X |
| 3,335,031 | 8/1967 | Kordesch | 136—125X |
| 3,335,032 | 8/1967 | Barnes | 136—26X |
| 3,427,203 | 2/1969 | Fletcher | 136—125X |
| 3,502,505 | 4/1970 | Jackson | 136—27 |
| 3,384,482 | 5/1968 | Kelly et al. | 75—201 |

BENJAMIN R. PADGETT, Primary Examiner

G. G. SOLYST, Assistant Examiner